C. R. REID.
REVERSIBLE ROTARY ENGINE.
APPLICATION FILED FEB. 17, 9112.
1,056,833.
Patented Mar. 25, 1913.
6 SHEETS—SHEET 2.
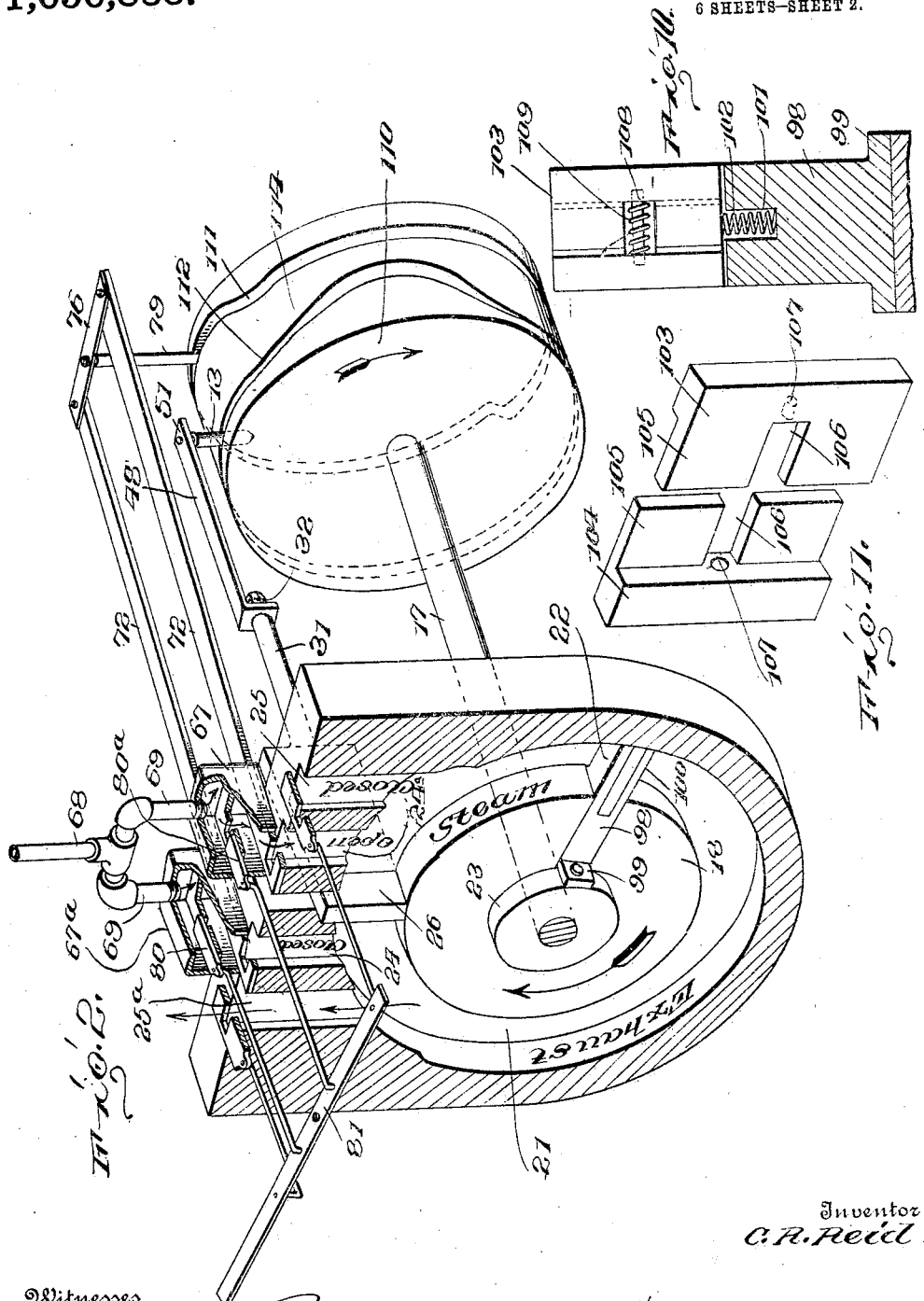
Witnesses
Inventor
C. R. Reid
By
Attorneys

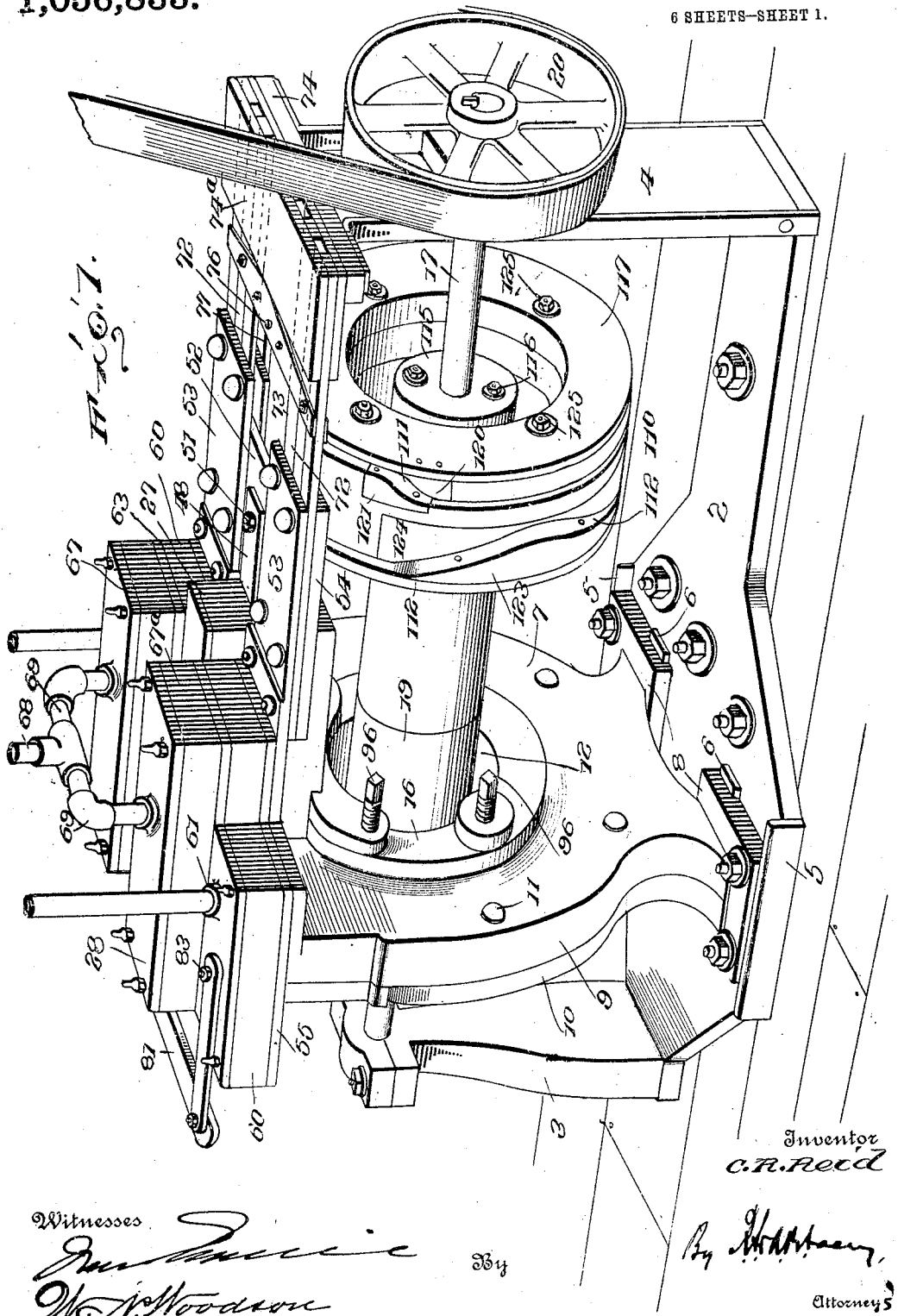

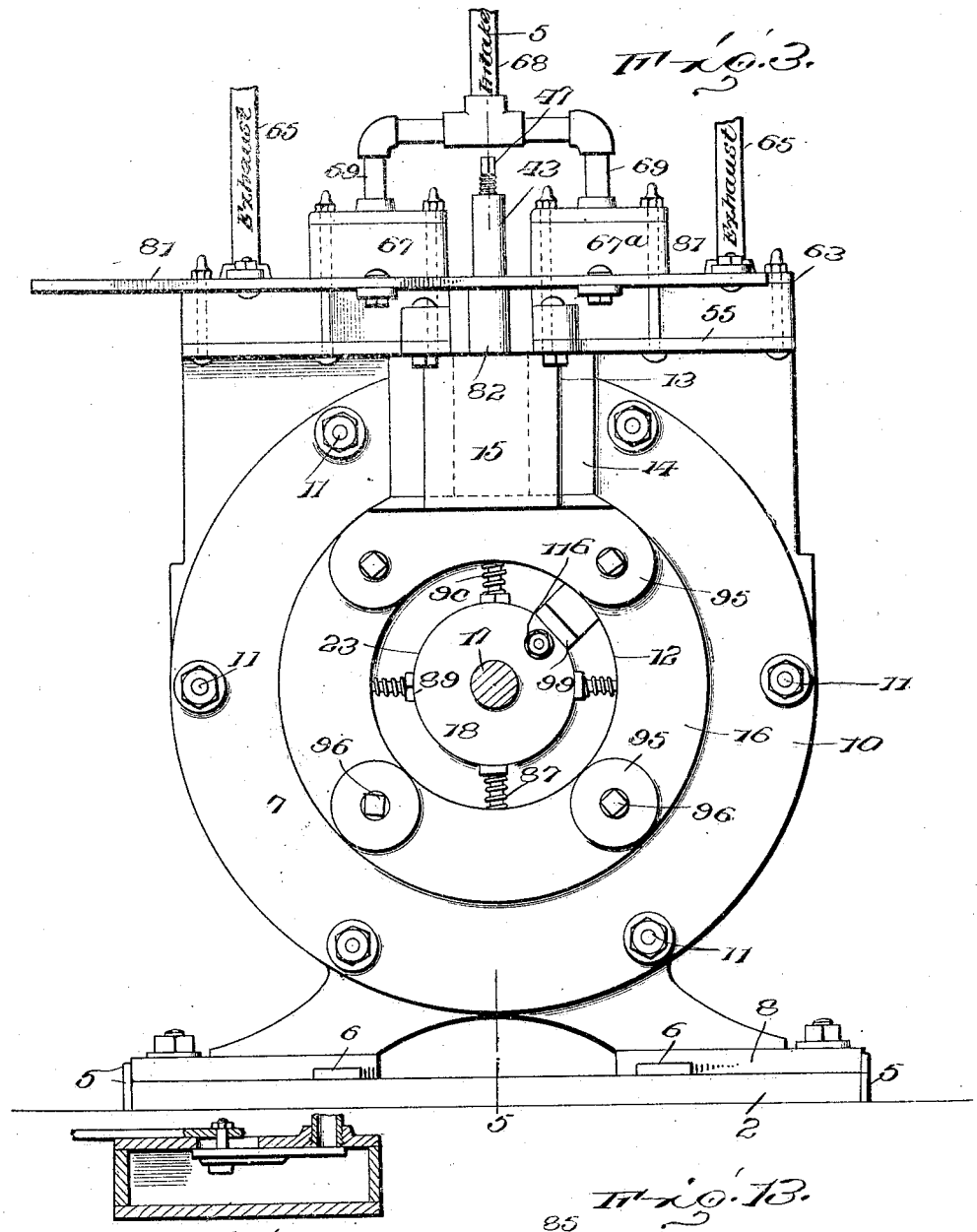

C. R. REID.
REVERSIBLE ROTARY ENGINE.
APPLICATION FILED FEB. 17, 9112.
1,056,833.
Patented Mar. 25, 1913.
6 SHEETS—SHEET 4.
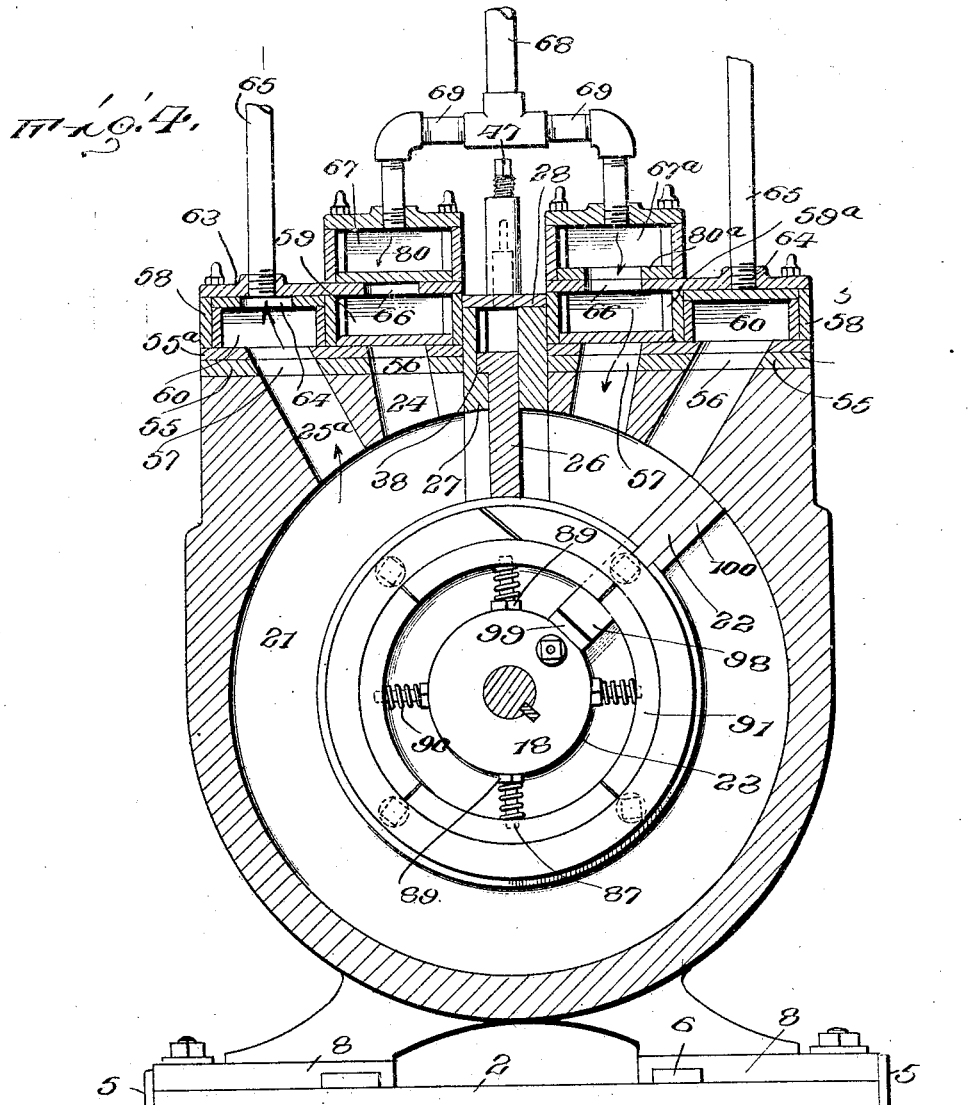
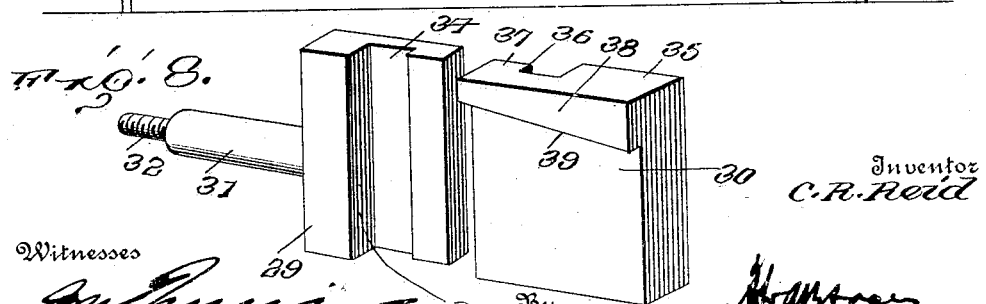

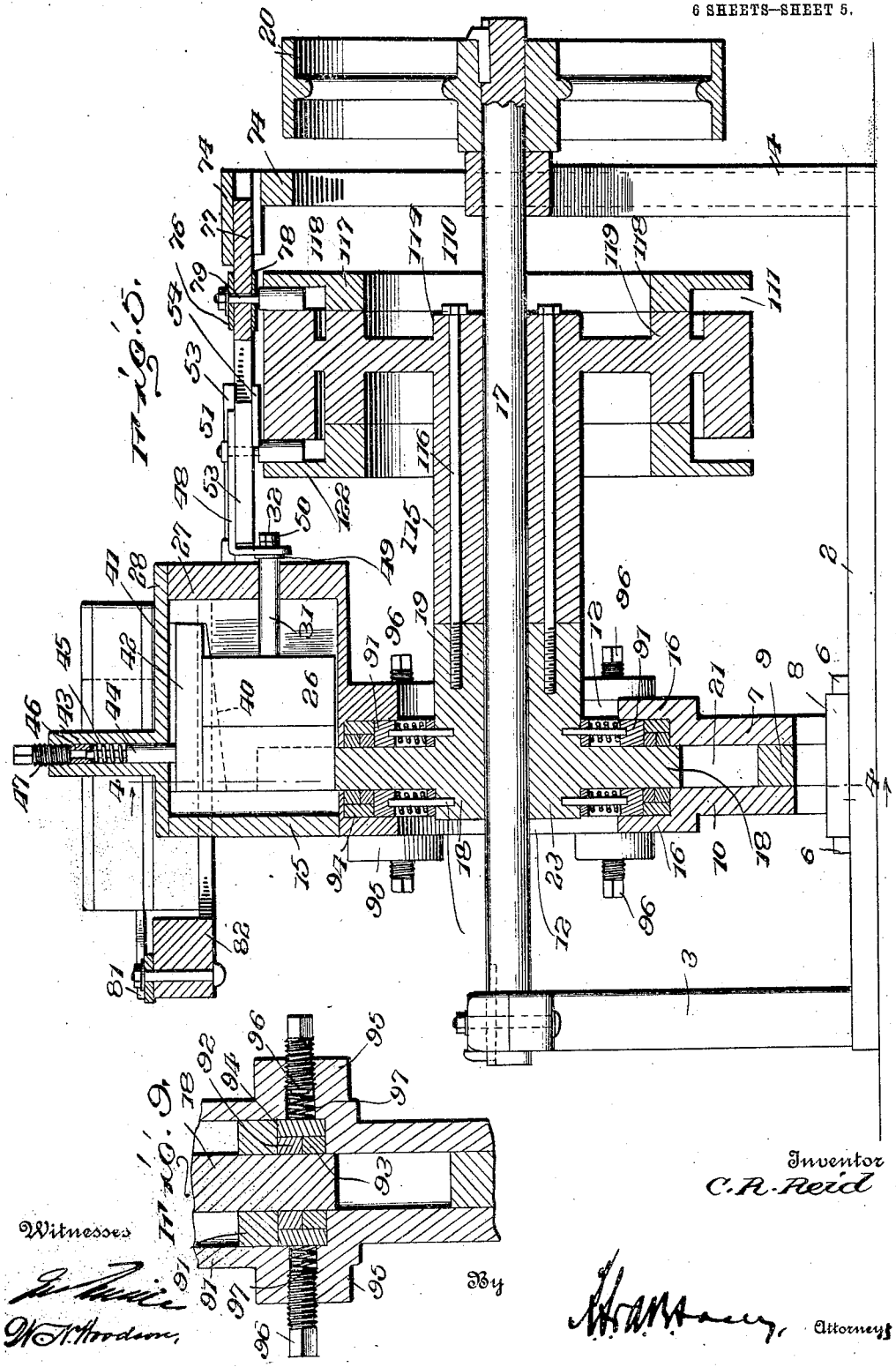

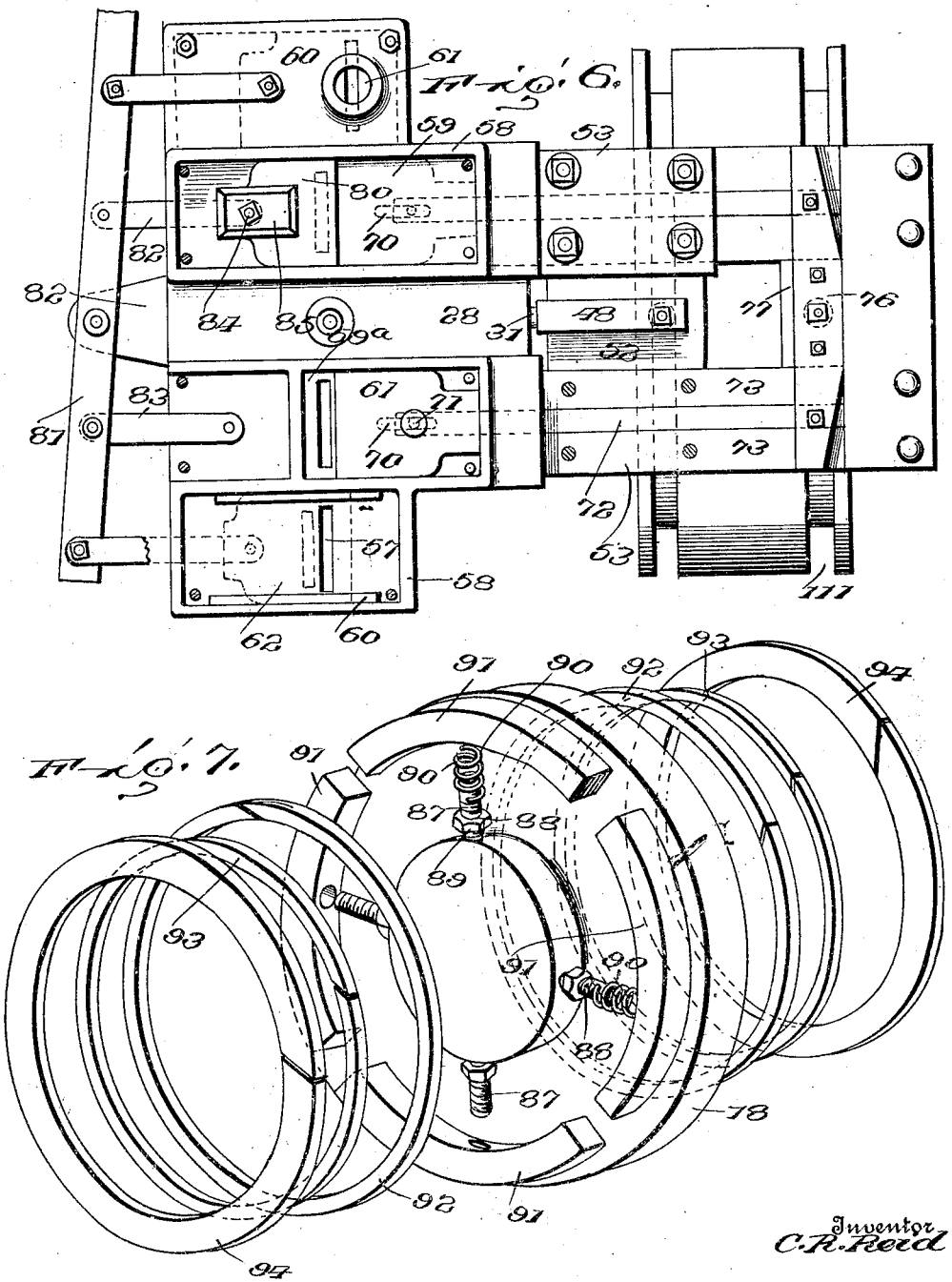

UNITED STATES PATENT OFFICE.

CHARLES R. REID, OF HEIDELBERG, MISSISSIPPI.

REVERSIBLE ROTARY ENGINE.

1,056,833.  Specification of Letters Patent.  Patented Mar. 25, 1913.

Application filed February 17, 1912. Serial No. 678,290.

*To all whom it may concern:*

Be it known that I, CHARLES R. REID, citizen of the United States, residing at Heidelberg, in the county of Jasper and State of Mississippi, have invented certain new and useful Improvements in Reversible Rotary Engines, of which the following is a specification.

My invention relates to engines, and particularly to rotary engines of that type in which the rotor is provided with one or more radially disposed rigid blades, and the rotor casing is provided with a movable abutment shiftable into and out of contact with the face of the rotor and also provided with inlet and outlet valves disposed on each side of the abutment.

Primarily the invention aims to provide a rotary engine of a simple and particularly effective character having the parts thereof so arranged that the engine may be reversed when desired by a simple manipulation of proper valves, or stopped entirely.

Another object of the invention is to provide effective means for packing between the rotor and the casing, such means including devices whereby the pressure of the packing upon the casing may be adjusted so as to provide for a steam-tight packing between the rotor and the casing itself.

A further object is to provide a laterally sliding abutment and mechanism for operating the same, thus simplifying the operating mechanism of the abutment and further rendering it possible to provide means for reducing the frictional engagement between the abutment and the face of the rotor by providing a construction wherein the abutment as it slides laterally to permit the passage of the piston blades lifts from the face of the rotor.

Still another object of the invention in this connection is to provide means whereby the abutment member proper may be readily removed to permit repair or replacement of the abutment, and further to provide means whereby the abutment may be yieldingly forced by adjustable means into proper engagement with the face of the rotor.

A further object of the invention is to provide a very simple and positively operated valve and abutment actuating means which may be readily adjusted and repaired without removal of any internal parts of the mechanism.

A still further object is to improve the construction of the rotor casing so as to permit the face plate of the rotor casing to be readily removed when it is desired to repair or replace the rotor, the removable face plate mit the face plate of the rotor casing to be moved and the packing devices thereof easily repaired or replaced.

Another object is to provide a cam for primarily actuating the valves and abutment of the engine, this cam being formed in sections so that the parts may be readily assembled or readily taken apart for repair or readjustment.

Other objects will appear in the course of the following description.

An embodiment of my invention is illustrated in the accompanying drawings, wherein:—

Figure 1 is a perspective view of my improved engine assembled; Fig. 2 is a skeleton perspective view of the rotor casing, the rotor therein, the cam for operating the valves and abutment, and the abutment and valve operating mechanism, the parts being broken away so as to show the manner of operation of the valves and abutment; Fig. 3 is an end elevation of my improved engine looking toward the rotor casing and the valve chests; Fig. 4 is a vertical section on the line 4—4 of Fig. 5, the front plate of the rotor casing being removed; Fig. 5 is a longitudinal section through the engine on the line 5—5 of Fig. 3; Fig. 6 is a plan view of the valve and steam chests of the engine, the cam for operating the valves and abutment and the connecting mechanism for the valves and abutment; Fig. 7 is a perspective detail view of the rotor and packing rings therefor, the packing rings being separated from each other so as to show their relation to the rotor; Fig. 8 is a detail perspective view of the sectional abutment removed from the abutment casing; Fig. 9 is a fragmentary sectional view through a portion of the rotor casing and through the packing rings thereof and the rotor, this view showing particularly the means whereby the packing rings are adjusted against the face of the rotor; Fig. 10 is a partial sectional view of the piston blade; Fig. 11 is a perspective view of the sectional piston blade, the parts being separated from each other. Fig. 12 is a longitudinal sectional view of exhaust valve casing, the valve being in elevation. Fig. 13 is a longitudinal sectional view through the inlet valve casing and the steam chests, the valves and connections being shown in elevation.

Corresponding and like parts are referred to in the following description and indicated in all the views of the accompanying drawings by the same reference characters.

Referring more particularly to Figs. 1, 3 and 4, it will be seen that the engine is mounted preferably upon a bed plate, designated 2, carrying at its ends the shaft supporting standards or pillars 3 and 4. The bed plate is widened at its middle for the support of the rotor casing and rotor and is provided at its side edges with the upstanding flanges 5 engaging with the outside edges of the rotor casing base, and the bed plate is also provided with the upstanding lug 6 engaging with the lateral side edges of the rotor base so that the rotor casing is centered upon the bed plate 2 and is held rigidly thereon. The rotor casing is preferably made in two sections. One of these sections, designated 7, comprises one side of the rotor casing, the base plates 8 therefor which are cast or otherwise formed in one piece with the section 7, and the marginal flange 9 which forms the circumference of the rotor casing. The casing is closed by means of a face plate, designated 10, conforming in outline to the shape of the rotor casing and detachably connected therewith by means of bolts 11 or other suitable attaching devices. Preferably the section 7, base plates 8 and the flanges 9 are all cast or otherwise formed in one piece.

The section 7 and the face section or plate 10 are both annular in general form. That is, they are both provided with a centrally disposed relatively large opening 12 concentric with the shaft of the rotor. The front plate 10 has the form of a ring, but the inner section 7 is not a perfect ring but is flat on top to provide for the attachment of the valve plates as will be later described. The front annular plate 10 is cut away as at 13 to accommodate the projecting end of the abutment casing which passes through the plate 10, and disposed at the margin of this opening are the vertically arranged flanges 14 upon which is detachably mounted a cover plate 15, as shown in Figs. 3 and 5.

As will be seen from Fig. 5, the inner margin of the plate 10 and the inner margin of the rear plate 7 are each formed with angular inwardly projecting flanges 16 adapted to accommodate certain rotor packing rings as will be later described.

Passing through suitable bearings mounted upon the standards 3 and 4 and journaled therein in any suitable manner is the shaft 17 as illustrated in Fig. 5. Keyed upon this shaft or otherwise attached so as to revolve therewith is the rotor 18. Projecting from the rotor is a sleeve 19 carrying a valve and abutment actuating cam as will be later described. This shaft 17 forms the main driving shaft of the machine and from it power may be taken as by means of the band wheel 20 keyed or otherwise attached to the shaft.

The rotor 18 as illustrated in Figs. 5 and 7 and particularly in Fig. 2 consists of a circular disk of less diameter than the rotor chamber designated 21 and inclosed by the rotor casing, and this rotor is shown as provided with a radial blade designated 22 having a length equal to the radial depth of the rotor chamber 21. The rotor is preferably formed with the oppositely disposed hubs 19 and 23 for the purpose of supporting the rotor packing rings as will be later described.

As illustrated in Figs. 2 and 4, the upper portion of the rotor casing is provided with the oppositely disposed inlet ports 24 and 24$^a$ and the oppositely disposed exhaust ports 25 and 25$^a$, these ports being disposed on each side beyond the inlet ports, there being an exhaust port and an inlet port arranged on each side of the abutment 26.

The abutment 26 slides laterally into the steam space 21 and is reciprocated laterally into and out of the path of travel of the piston blade 22. The abutment is contained within an abutment casing, shown in Fig. 5 and designated 27. The forward end of this casing is closed by the plate 15 as previously described. The upper end of the casing is closed by a removable plate 28, supporting means whereby the abutment may be yieldingly forced downward into yielding contact with the face of the rotor.

The sliding abutment is preferably formed in two sections as illustrated in Fig. 8. One of these sections is designated 29 and the other 30. The section 29 has projecting from it a rod 31 screw threaded at the end as at 32, whereby to provide means for connecting the abutment to a connecting rod or pitman. The section 29 is formed at its rear end with a laterally projecting shoulder 33 and the face of the section 29 is vertically grooved as at 34. The section 30 is formed with a relatively wide shoulder 35 at its outer end defining one wall of a vertically disposed groove 36, the groove being defined by a shoulder or flange 37 on the inner margin of the section 30. It will be seen therefore that when the parts are placed together the flange 37 will fit within the groove 34 while the flange or shoulder 33 will fit within the groove 36. Thus the parts will be connected for lateral movement but the section 30 may be readily shifted vertically to remove it from engagement with the section 29, and it will also be seen that the section 30 has independent vertical movement relative to the section 29.

In order to provide for lifting the section 30 of the abutment, which forms the abutment proper, from contact with the face of the rotor as the abutment is drawn laterally out of the path of movement of the piston blade, I form the upper margin of the section 30 with a shoulder 38 having an upwardly and outwardly inclined lower face 39 co-acting with an upwardly and outwardly inclined shoulder 40 defining the lower wall of a recess 41 formed in the side wall of the abutment casing, as illustrated in Fig. 4 and in dotted lines in Fig. 5. It will be seen that the inclined faces of the shoulder 38 and of the shoulder 40 contact with each other and that as the abutment is drawn outwardly these upwardly and outwardly inclined faces will cause the abutment to lift so as to entirely clear the face of the rotor and thus prevent any frictional engagement between these faces. Furthermore when the abutment has been drawn fully over it is some distance above the face of the rotor so that as it moves back to its normal position it will move inward without engaging or catching upon the corner of the rotor, thus eliminating the necessity of a very fine adjustment between the face of the abutment and the rotor. Thus if the rotor should be slightly out of true, there would be no catching between the abutment and the rotor. Furthermore it will be seen that even when the abutment is in its outward position, as shown in Fig. 5, the abutment section 30 may rise and fall independently of the section 29 and thus accommodate itself to any irregularity in the curvature of the rotor, which irregularity may occur from an unequal wear on the several parts.

The abutment member 30 is held in yielding contact with the face of the rotor by the means shown in Fig. 5.

Disposed in the upper portion of the abutment casing immediately below the plate 28 is a platen or plunger 42 which is guided between vertical shoulders formed in the side wall of the abutment casing and which bears upon the upper face of the abutment member 26. The plate 28 is formed with an upwardly projecting tubular casing 43 and the plunger 42 is provided with the upwardly projecting rod or stem 44 which projects into the casing 43. The upper end of this stem is reduced and surrounding this reduced portion is a coiled spring 45. Disposed upon this coiled spring is a relatively small tubular sleeve 46. Screw threaded into the upper portion of the casing 43 is an adjusting pin 47 having a many sided head, whereby a wrench may be applied to the inner end of the screw pin bearing upon the sleeve 46. It will be obvious that by turning the screw pin in one or the other direction the tension of the spring 45 may be readily adjusted and the degree of pressure upon the plunger 42 adjusted.

The rod 31 projects out through the wall 27 of the abutment casing and its reduced end passes through the downwardly turned end of an angular strap 48 forming a connecting rod. A washer 49 is disposed between the downwardly turned end of the strap 48 and the enlarged portion of the rod 41 and lock nuts 50 are applied to the reduced portion of the rod so as to hold the rod 31 and the strap 48 in proper engagement with each other. It will be obvious that by inserting washers and screwing up or out upon the nuts 50 that it is possible to correctly adjust the abutment relative to the connecting strap 48. The strap 48 is attached by means of a bolt 51 to a slide 52 mounted between the upper and lower guide plates 53 and 54, as shown in Fig. 1, and this slide is reciprocated by means of a cam as will be later described.

Disposed upon the top of the rotor casing is a plate 55 forming the bed plate or base plate for the inlet and exhaust valves as will now be described. There are two of these plates 55 and they are disposed on either side of the abutment casing. It will be understood, however, that while I describe these parts 55 as being plates as if separate and distinct from the rotor casing, they might be formed integral with the rotor casing. Each of these plates 55 is provided with an inlet port 56 and an exhaust port 57. These ports have the form of transversely extending slots, as shown in Fig. 6, and are coincident of course with the ports 24ª and 25 immediately below.

Uprising from the plates 55ª are the walls 58 which define and surround valve chambers 59 and 60, the valve chamber 59 inclosing an inlet valve 61, while the valve chamber 60 incloses an exhaust valve 62. Covering the top of the valve chests 59 and 60 is a plate 63 which forms the top of the exhaust valve chest 60. This plate is formed as shown in Fig. 4 with an outlet port 64 from which an exhaust pipe 65 extends and with a port 66 disposed over the inlet valve chamber 59. This port 66 opens into a steam chest 67. It will be understood that there are two of these steam chests, one for each of the inlet ports 24 and 24ª. The steam chest for the port 24 is designated 67, while the steam chest for the port 24ª is designated 67ª. Each of these chests 67 and 67ª is connected to a source of steam. As illustrated in Figs. 1 and 4 the steam is carried to the steam chest by means of a conducting pipe 68' having laterally disposed branches 69, each of these branches being formed with downwardly extending pipes entering the steam chests 67 and 67ª. Both of these steam chests are always filled with live steam.

The bottom of each of the valve chests 59 and 59ª is longitudinally slotted as at 70 and disposed within each of the valve chests 59 and 59ª is a sliding valve 61 which is provided with a downwardly extending pin 71. This pin passes downward and is engaged with a sliding rod 72. There are two of these sliding rods of course and each sliding rod is guided between longitudinally extending fixed members 73 supported at one end by being bolted to the rear ends of the plates 55 and at their outer ends being supported upon a cross piece 74, as illustrated in Fig. 1. The plates 53 and 54 are bolted to these longitudinal members 73 and said plates 53 and 54 project beyond the inner member 73, as shown in Fig. 1, so as to form guides for the slide 52, as previously described. It will be seen that these plates 53 and 54, while detachable, act to hold the rods 72 in proper position between the guides 73 and prevent any accidental disarrangement of the sliding rods 72, while being capable of being removed so as to permit the removal of the rods 72, guides 73 and the removal of the slide 52. A plate 74ª extends over the outer ends of the guides 73 as illustrated in Fig. 1, the rods 72 extending into the space defined by the ends of the guides 73 and the plates 74 and 75.

Both valve rods 72 are reciprocated together and to this end are connected by means of a yoke 76 which is bolted or otherwise attached to a slide 77 moving between the guides 73 and movable into the space defined by the plates 74 and 75 and the inner guides 73, as illustrated in Fig. 6. There are two of these yoke bars 76, one of them, previously referred to, being placed upon the upper faces of the rods 72 and guides 73, while the other 78 is located on the under faces of these rods 72. Projecting downwardly from the middle of the yoke bars 76 and 78 is a pin 79 which engages in a cam track of the cam immediately beneath, as shown in Fig. 5. This cam track is so arranged that upon each complete rotation of the rotor the rods 72 are given a complete reciprocation to open the inlet valves, hold them open for any desired length of time and then close them at the moment that the piston blade is passing the abutment and until such time as the abutment again comes back to its normal position. A cam track is also provided for reciprocating the abutment so as to draw the abutment to one side to permit the passage of the piston blade and then force the abutment inward to its normal position after the piston blade has passed.

To provide means for cutting off the steam entirely or for admitting steam to one or the other side of the piston blade so as to cause a rotation of the rotor in one or the other direction, I provide the cut-off valves 80 and 80ª, these valves being located within the steam chests 67 and 67ª and sliding therein to their closed or opened positions. These valves are intended to be manually reciprocated so as to cut off the admission of steam through either the port 66ª or the port 66 and thus cut off or admit steam to one or the other of the ports 24 and 24ª. For the purpose of manually actuating these valves, I have provided the rocker arm 81 which is pivoted at its middle upon a bracket 82 projecting from and forming the outer end of the abutment casing, this bracket being bolted to a projecting portion of the plate 55. The rocker arm 81 is connected on opposite sides of its pivotal point with the valves 80 and 80ª by means of connecting rods 83. Each of these connecting rods extends from the under face of the rocker arm 81 beneath the plate 55 and carries at its end an upwardly projecting pin or bolt 84 (see Fig. 13) which passes up through the valve 80 or 80ª, the other face of the valve being strengthened by a reinforcing member 85 through which the bolt passes. The valve is of course the same width as the valve chest in which it moves and as a consequence it is guided in its reciprocations. The valve is held down upon the face against which it slides by the steam or other fluid pressure behind the valve. It will be seen that when a valve is moved inward it cuts off the steam and prevents the entrance of steam from the steam chest into the inlet valve chest immediately beneath and when the valve is moved outward it permits the entrance of steam. Further, it will be seen that by moving the rocker arm 81 to its middle position both of the valves will be shifted to cut off position, and further, it will be seen that by shifting the rocker arm more or less the amount of steam which passes from the steam chest to the engine may be regulated. The rocker arm 81 therefore and its attached parts constituted means whereby all steam may be cut off from the engine, or whereby the steam may be admitted to one or the other side of the opposite valve to cause the rotor to move in one or the other direction.

It will be obvious that the exhaust valves must move in correspondence with the controlling valves 80 and 80ª so that when, for instance, the controlling valve 80ª is open the exhaust valve 62ª will be opened and vice versa. This is the position of the parts shown in Fig. 4, where the steam entering through the port 24ª strikes the piston, rotates the rotor in the direction of the arrow and the exhaust passes out of the exhaust port 25ª and into the exhaust valve chamber 60 and out through the exhaust pipe 65. When the rocker arm is shifted in the opposite direction, the valve 80 is opened and the valve 80ª is closed. As a consequence steam will enter the steam space 21 through the port 24 and act reversely upon the piston, in which case the port 25 becomes the exhaust port and the valve 62 is opened, while the valve 62ª is closed.

As a means of packing the rotor and piston so as prevent any escape of steam between the rotor and the sides of the rotor casing and at the same time prevent any binding between the rotor and rotor casing, I have provided the packing arrangement illustrated in detail in Fig. 7 and also clearly shown in Fig. 5. The rotor, as before stated, is formed with a central relatively wide hub projecting on both sides of the rotor so as to provide oppositely projecting shoulders. The main portion of the rotor is spaced from the opposite sides of the casing, as will be seen in Fig. 5, and in that space is located certain packing rings. Mounted in sockets in the projecting head 23 of the rotor are the radially extending pins 87 which are screw threaded intermediate their ends as at 88 for engagement with the tightening nuts 89. Surrounding each of the pins 87 is a coiled spring 90. Loosely mounted upon each of the pins 87 is an arcuate section 91. As illustrated, there are four of these sections which together form a split ring separated or split at four different points. These sections fit loosely upon the ends of the pins 87 and the springs 90 thereon act to force the sections resiliently outward. By tightening up or retracting the corresponding nut 89 the springs 90 may be more or less tightened or loosened and thus the force with which the sections 91 are urged outward may be adjusted. Surrounding the circumference of the ring formed by the sections 91 and disposed immediately against each face of the rotor are the split packing rings 92. Surrounding these rings in turn and bearing against the face of the rotor are the split packing rings 93. These rings 92 and 93 have a width only equal to half the depth of the sections 91 and disposed between these rings 92 and 93 and bearing against the outside faces of the same are the split packing rings 94 which have a radial width equal to the combined radial widths of the rings 92 and 93.

The faces of the rotor casing are provided at a plurality of points with the thickened portions or bosses 95, as illustrated particularly well in Figs. 3, 5 and 9, and also shown in Fig. 1. Through these bosses 95 pass the packing adjusting screws 96, as illustrated in Fig. 9. These adjusting screws have square outer ends for engagement with a wrench, while the inner ends of the adjusting screws bear against the rings 94, as clearly shown in Fig. 9. By tightening up on these adjusting screws, the rings 94 will be forced inward and into more or less frictional engagement with the packing rings 92 and 93. These packing rings may be formed of any suitable material and by their use it is possible to secure a perfectly steam-tight engagement between the rotor and the casing without at the same time subjecting the rotor to such friction as will necessitate the expenditure of a great amount of power to overcome the friction. It will be seen that the springs 90 tend to force the sections 91 outward and these in turn force the packing rings 92, 93 and 94 radially outward. These rings being split will be resiliently expanded by means of the springs 90 against the inside face of the rotor casing. At the same time the springs 97 which are acted upon by the screw pins 96 will resiliently press inward against the packing rings 94, 92 and 93 and force the rings 92 and 93 against the inside face of the rotor, making a steam-tight joint.

The piston blade is constructed as illustrated in detail in Figs. 10 and 10ª. The body of the blade is designated 98 and is formed with laterally projecting flanges 99 which are attachable to the hubs of the rotor as shown in Fig. 4, the rotor being radially slotted or cut away to receive the body 98 of the piston blade and permit its removal or replacement, as indicated clearly in the diagrammatic view, Fig. 2. Projecting upward from the body portion are two spaced ears 100, and the body portion 98 is provided at its middle between these ears with a socket 101 within which is disposed a coiled spring 102 which expands outward. Disposed between the ears 100 are the sections 103 and 104. These are formed with overlapping portions 105 less in thickness than the main body of the sections, these overlapping portions having sliding engagement with each other. Both of these sections are cut away at the middle as at 106 and each is provided with a socket 107. A pin 108, shown in dotted lines in Fig. 10, is disposed in said socket and surrounding this pin is a coiled spring 109 which acts to force the sections outward. It will thus be seen that these sections are laterally expanded resiliently against the side walls of the rotor casing and that both of these sections are forced outward against the circumferential wall of the rotor casing by means of the coiled spring 102. I thus secure a steam-tight engagement between the piston blade and the rotor casing, with, however, a minimum of friction. This packing prevents the steam from passing around either side of the wing or blade and the spring 102 forces the packing outward against the inner face of the circumferential wall of the rotor casing and thus prevents the steam from passing over the end of the piston blade.

It will be seen that both as regards the packing rings 92, 93 and 94 and the piston packing that the steam will to a certain extent lubricate this packing so that friction between the packing and the rotor or between the packing and the rotor casing will be reduced to a minimum, while at the same time a perfectly steam-tight fit is assured.

For the purpose of operating at predetermined times the abutment and the inlet valves, I have provided a cam, designated generally 110. This cam is formed with two cam tracks 111 and 112. The cam track 111 is for the purpose of operating the valves, while the cam track 112 operates the abutment. Each of the pins 51 and 79 are provided with rollers 113 so that an easy antifrictional contact is secured between the side walls of the cam tracks and the pins.

Preferably the cam 110 is peculiarly constructed and formed in sections so that it may be readily made and the parts readily assembled. By referring to Figs. 1 and 5 it will be seen that the cam consists of a main body portion 114 having a hub surrounding the shaft 17 and rotating therewith, said hub projecting to a relatively slight degree on one side of the main body portion 114 and to a longer degree on the other side of this main body portion as at 115. This projecting hub or sleeve 115 contacts with the projecting hub 19 of the rotor 18, as shown in Fig. 5, and is rigidly connected therewith by means of longitudinally extending bolts 116 passing through the ends of the hub. The outer section of the cam is designated 117 and comprises an annular plate having an inwardly projecting flange 118 adapted to engage with a flange 119 formed upon the central body portion 117 so that when the two portions 117 and 114 are assembled they will be separated from each other a space greater than the width of the cam track 111. The inner face of the annular plate 117 is faced for a portion of its length with a cam face plate 120, while the outer face of the flange 119 is faced for a portion of its length with a cam plate 121. These plates 120 and 121 are formed of steel, while the body portion 114 and the plate 117 with its flange 118 may be formed of cast iron, as it is only the inclined or cam faces which have any wearing engagement with the rollers mounted upon the pins 79 and 51. The third section of the cam is designated 122, this section being formed of cast iron having a central hub engaging with the hub of the section 114 so as to hold the sections in spaced relation to each other. The adjacent faces of the portion 114 and the plate 122 are provided along proper portions of their length with the steel cam face plates 123 and 124. These cam faced plates may be held to the portions 117, 114 and 122 by means of countersunk bolts or like devices. The three sections of the cam are held in engagement with each other by longitudinally extending bolts 125, as illustrated in Fig. 1. It will be seen that this construction permits the cam to be readily manufactured and the parts readily assembled, and also permits the removal and renewal at any time desired of the cam faces forming the outer and inside walls of the cam grooves.

The operation of my engine will be perfectly obvious from what has gone before and generally speaking requires no further description. It may be stated, however, that the reversing mechanism described by me is of particular value inasmuch as it is positive in its action and provides not only for a reversal of the engine, but for cutting off or cutting down the amount of steam admitted to the rotor casing. It is extremely simple, requires no complicated valve gears, nor does it require stuffing boxes in the steam chest, as before described.

It is well known that one of the principal problems in the construction of a rotary engine is the provision of packing which, while preventing the passage of steam around the piston blade or blades, or around the abutment, will not act to impede the rotation of the engine or cause a waste of power. My improved packing is such that it may be readily adjusted while the engine is running so as to prevent any waste of steam and at the same time prevent any waste of power.

It will be seen that my improved engine is so constructed that all of the parts are readily assembled and that there is no difficulty in getting at the rotor, piston or the packing, and that the valve mechanism may also be readily repaired. It is pointed out particularly that the packing rings upon the rotor may be controlled without the necessity of opening the rotor casing, by reason of the fact that the lateral pressure of the packing rings is adjusted entirely by the screws 96 and the radial pressure of the packing is controlled by the nuts 89 which are always exposed in such a position that they may be readily operated. Furthermore, it will be seen that the amount of pressure exerted upon the abutment may be readily adjusted by means of the screw 47, and again it is pointed out in this connection that I have provided an important improvement in rotary engines by providing means whereby the abutment will lift as it moves laterally from the face of the rotor. Thus the abutment is held in steam-tight contact with the face of the rotor and yet freed from the face of the rotor when it is necessary to shift the abutment out of the way of the piston blade.

It will be perfectly obvious that the particular form of the cam tracks 111 and 112 may be changed as desired so as to cause the inlet valves to admit steam for any length of time desired and to cut off at any desired period. It will be obvious that as this is a matter of detail entirely familiar to all those who understand engine practice, there is no necessity in illustrating such change in structure. It will also be obvious that it is entirely possible to place a pair of the engines as described upon the same driving shaft and to control not only the inlet valves from the same cam but also control the cut-off valves and the exhaust valves by the same rocker arm. Thus my improved engine forms a unit which may be coupled up with other units to any desired degree and these units either may be signally controlled or they may be all controlled by a single actuating device. Each pair of units, however, has a single means, namely, the cam, for controlling the inlet valves and abutments.

While I have illustrated what I regard as the most effective form of my invention, it will be understood that I do not wish to be limited to the precise details of construction as illustrated and described, as many variations in structure might be made without departing from the spirit of the invention.

What I claim is:

1. In a rotary engine, a bladed rotor, a rotor casing, an abutment laterally shiftable through the wall of the rotor casing into and out of contact with the face of the rotor, means operated by the rotor for laterally shifting said abutment, and means for lifting said abutment from the face of the rotor as it moves outward and guiding said abutment toward the face of the rotor as it moves into the casing.

2. In a rotary engine, a bladed rotor, a rotor casing, a laterally shiftable abutment shiftable through the wall of the rotor casing into contact with the face of the abutment, means operated by the rotor for laterally shifting said abutment, and a member having an inclined guiding surface with which the abutment engages, whereby to cause the abutment to lift from the face of the rotor as it moves outward and to be depressed against said face as it moves into the casing.

3. In a rotary engine, a bladed rotor, a rotor casing having an abutment opening, an abutment casing, a laterally shiftable abutment mounted within said casing, means operated by the rotor for laterally shifting the abutment, a plunger disposed within the abutment casing and bearing against the outer end of the abutment, and yielding means for forcing said plunger against the abutment.

4. In a rotary engine, a bladed rotor, a rotor casing having an abutment opening, an abutment casing, a laterally shiftable abutment mounted within said casing, means operated by the rotor for laterally shifting the abutment, a plunger disposed within the abutment casing and bearing against the outer end of the abutment, a spring bearing against said plunger and yieldingly forcing it against the abutment, and means for adjustably compressing said spring.

5. In a rotary engine, a bladed rotor, a rotor casing having an abutment opening, an abutment casing disposed over said opening, an abutment laterally slidable in the casing into and out of the path of movement of the rotor blade, means actuated by the rotor for reciprocating said abutment, means disposed in the abutment casing for lifting the abutment from the face of the rotor as it moves outward and depressing it as it moves inward, and yielding means for forcing the abutment against the face of the rotor.

6. In a rotary engine, a bladed rotor, a rotor casing having an abutment opening, an abutment casing disposed over said opening and having laterally and outwardly inclined guide shoulders, an abutment mounted in said casing and having inclined shoulders contacting with the guide shoulders of the casing, means for reciprocating said abutment, and yielding means for forcing the abutment toward the face of the rotor.

7. In a rotary engine, a bladed rotor, a rotor casing having an abutment opening, an abutment chest mounted above the abutment opening, a laterally slidable abutment mounted in said chest, said abutment being made in two sections, one of said sections being outwardly shiftable with relation to the other section, means for reciprocating the abutment, and means for yieldingly urging the movable section of the abutment toward the face of the rotor 8. In a rotary engine, a bladed rotor, a rotor casing having an abutment opening, an abutment chest disposed above the opening, a laterally slidable abutment mounted in said chest and composed of two sections, one of said sections having a connecting rod passing out through the rotor chest, the other section being outwardly movable relative to the first named section, means in the rotor chest for causing the movable section to lift as the abutment moves laterally outward and to be depressed as the abutment moves inward, means operated by the rotor for causing a lateral reciprocation of the abutment, and yielding means urging the movable section of the abutment into contact with the face of the rotor.

9. In a rotary engine, a bladed rotor, a rotor casing having an abutment opening, an abutment chest over said opening, an abutment section vertically and laterally movable in said chest, a head to which the movable section is slidingly connected for outward movement, said head having a rod projecting out from the chest, means actuated by the rotor and operatively connected to the rod for causing a reciprocation of the abutment, means disposed within the chest for outwardly moving the abutment upon a lateral movement of the abutment out of the rotor casing and for depressing said abutment section upon a movement into the rotor casing, a plunger bearing upon the movable section of the abutment, a spring operatively engaging said plunger to force it inward, and a screw for adjusting the tension of said spring.

10. In a rotary engine, a rotor casing, a rotor therein, said rotor having a radial seat formed in its margin and laterally projecting hubs, a blade comprising a body portion disposed in said seat and having laterally projecting flanges engaging the hubs of the rotor, said body portion of the blade being formed with spaced ears projecting beyond the circumference of the rotor, laterally expansible packing sections disposed between said ears, and means for yieldingly urging said packing sections outward.

11. In a rotary engine, a rotor, and a rotor casing, radially urged packing rings disposed between the side face of the rotor and the casing, and means on the casing for resiliently forcing the packing rings laterally against the side faces of the rotor.

12. In a rotary engine, a rotor casing having oppositely disposed side walls and a circumferential wall, split packing rings disposed within the casing between the rotor and the circumferential and side walls of the rotor casing, means on the rotor for resiliently urging said split packing rings outward, and means on the rotor casing for yieldingly urging the packing rings against the side face of the rotor.

13. In a rotary engine, a rotor having outwardly projecting hubs, a rotor casing inclosing the rotor and having side walls and circumferential walls, arcuate members disposed concentrically to the hubs of the rotor and between the rotor and the casing, springs urging said arcuate members outward, split packing rings supported upon said arcuate members and concentric thereto, and means passing through the side walls of the rotor casing and acting to yieldingly force said packing rings inward against the face of the rotor.

14. In a rotary engine, a bladed rotor, a rotor casing, the rotor being formed with oppositely projecting hubs, pins extending radially from said hubs, springs surrounding said pins, arcuate sections mounted on said pins concentric to the hubs and urged outward by the springs, split packing rings concentric to the arcuate sections and mounted thereon and disposed between the side faces of the rotor and the side walls of the casing, and means extending through the side walls of the casing for yieldingly forcing the packing rings against the faces of the rotor.

15. In a rotary engine, a bladed rotor, a rotor casing, said rotor having hubs projecting on each side and the side walls of the rotor casing being spaced from the side faces of the rotor, arcuate members resiliently supported upon said hubs concentric to the hubs, a plurality of split inner packing rings supporting said arcuate members and disposed adjacent to the side faces of the rotor, a split packing ring also mounted upon the arcuate members and bearing against the outer faces of said first named packing rings, adjusting screws passing through the side walls of the casing, and springs engaged by said adjusting screws and yieldingly bearing against the last named packing rings.

16. In a rotary engine, a rotor casing, a bladed rotor therein, a shaft upon which the rotor is mounted, a cam mounted on the shaft, an abutment casing mounted upon the rotor casing, a laterally slidable abutment mounted within the abutment casing, means for moving said abutment radially outward simultaneous with the lateral outward movement of the abutment, a slide operatively connected to the cam for actuation thereby, and adjustable means connecting the slide and the abutment.

17. In a rotary engine, a rotor casing, a rotor therein, a shaft upon which the rotor is mounted, a cam on said shaft having a pair of cam tracks, an abutment casing mounted upon the rotor casing, a laterally slidable abutment in said abutment casing, a slide operatively connected to one of said cam tracks and to said abutment, oppositely disposed spaced guides within which the slide moves, a pair of inlet valves disposed on each side of the abutment and controlling the passage of motive fluid to the rotor casing, sliding members operating in said guides and located on each side of the abutment slide and operatively connected to said valves, and downwardly projecting pins on said sliding members engaging with the second one of said cam tracks.

18. In a rotary engine, a rotor casing, a shaft passing therethrough, a rotor mounted on the shaft, a cam mounted on said shaft and having double cam tracks, an abutment movable into and out of the rotor casing, a slide to which the abutment is operatively connected, guides within which said slide moves, a downwardly projecting member on said slide engaging one of said cam tracks, oppositely disposed valves controlling the passage of motive fluid to the rotor casing, sliding rods connected to said valves, transversely extending yokes connecting said rods, guides within which the rods move, and a downwardly extending pin on said rods engaging the other of said cam tracks.

19. In a rotary engine, a rotor casing, an abutment casing mounted upon the rotor casing, inlet valve chests disposed on either side of the abutment casing and having ports leading into the rotor casing, exhaust valve chests disposed on each side of the pair of inlet valve chests, steam chests disposed upon the inlet valve chests, reciprocating inlet valves mounted in the inlet valve chests, slidable exhaust valves mounted in the exhaust valve chests, slidable controlling valves disposed in the steam chests, manually operated means for simultaneously, reversely shifting the exhaust valves and the controlling valves, a rotor within the rotor casing, a shaft upon which the rotor is mounted, a double cam mounted upon said shaft, a laterally shiftable abutment in the abutment casing, a standard within which the shaft is journaled, guide members supported upon said standard at one end and upon the base plate of the valve chests at the other ends, a longitudinally reciprocating slide mounted in said guide members operatively connected to one of said cam tracks and to the abutment, and a pair of longitudinally reciprocating sliding valve rods operatively connected at one end to the inlet valves and at their other ends to the other of said cam tracks, and means for admitting steam to both of said steam chests.

20. In a rotary engine, a rotor casing, a rotor therein, an abutment, valves controlling the passage of steam to the rotor casing, a cam made up of sections, wear faces detachably connected to the sections and forming part of the cam tracks and members engaging said cam track and operatively engaging the valves and the abutment, whereby to operate the valves and abutment from the cam.

21. In a rotary engine, a rotor casing, a rotor therein, an abutment, valves controlling the flow of steam to the rotor casing, a cam having a plurality of tracks and comprising a middle section, the two end faces of which form the inner faces of the cam tracks, oppositely disposed outer sections, the inner faces of which form the outer faces of the cam tracks, means for detachably holding the sections together, detachable wear pieces attached to said sections at the angular portions of the cam tracks, rods operatively connected to the valves and abutment, and pins extending from said rods into the cam tracks.

In testimony whereof I affix my signature in presence of two witnesses.

CHARLES R. REID. [L. S.]

Witnesses:
M. R. MORGAN,
JAS. S. MORGAN.